United States Patent [19]
Yanagimachi

[11] 4,172,636
[45] Oct. 30, 1979

[54] DOOR SCOPE

[75] Inventor: Masanori Yanagimachi, Kawasaki, Japan

[73] Assignee: Nicon Co., Ltd., Kawasaki, Japan

[21] Appl. No.: 836,730

[22] Filed: Sep. 26, 1977

[51] Int. Cl.² ............................................. G02B 3/00
[52] U.S. Cl. ..................................... 350/212; 350/69; 350/78; 350/159; 350/205
[58] Field of Search ............... 350/205, 159, 212, 69, 350/78

[56] References Cited
U.S. PATENT DOCUMENTS

| 3,514,188 | 5/1970 | Blosse et al. ........................ 350/212 |
| 4,082,434 | 4/1978 | Hayashi et al. .................. 350/212 X |

FOREIGN PATENT DOCUMENTS 1378602 10/1964 France ........................................ 350/69

Primary Examiner—Paul A. Sacher
Attorney, Agent, or Firm—Gerald J. Ferguson, Jr.; Joseph J. Baker

[57] ABSTRACT

A door scope provided in a door for viewing outside from inside includes an optical system consisting of five lenses: a large diameter objective having a concave rear face, two auxiliary objectives having concave rear faces, a biconcave compensation lens and an eyepiece. The compensation lens is located behind the two auxiliary objectives or therebetween. A peep preventing device consisting of two polarizers one of which is made rotatable with respect to the other is attachable to the door scope. The compensation lens is preferably made of glass material different from that of the other lenses to correct chromatic aberration.

15 Claims, 5 Drawing Figures

DOOR SCOPE

BACKGROUND OF THE INVENTION

1. Field of the Invention

This invention relates to a door scope, and more particularly to an improvement in a door scope which is an optical device provided in a door for viewing outside from inside of the door.

2. Description of the Prior Art

It has been known in the art to provide an optical device in a door for viewing outside from inside. (This optical device will hereinafter be referred to as a "door scope"). The conventional door scope consists of an objective of large diameter, an eyepiece, and a pair of auxiliary objectives provided immediately behind the objective. The pair of auxiliary objectives are both planoconcave and the concave faces of the objectives are faced to each other. In a door scope, the angle of view is desired to be as large as possible. Further, the conventional door scope has a defect in that the optical system has a chromatic aberration since all the lenses are made of the same glass material.

Further, the conventional door scope has a defect in that it is possible to peep therethrough from outside.

SUMMARY OF THE INVENTION

It is, therefore, the primary object of the present invention to provide a door scope which has a wide angle of view.

Another object of the present invention is to provide a door scope which is free from chromatic aberration.

Still another object of the present invention is to provide a door scope which is provided with means for closing the optical path thereof for preventing peep in the reverse direction.

The primary object is accomplished by utilizing two planoconcave lens as auxiliary objectives located immediately behind an objective with their concave faces faced to the rear and a biconcave compensation lens located behind or between the auxiliary objectives. The second object is accomplished by making the compensation lens of a glass material different from that of the auxiliary objectives to correct chromatic aberration. The compensation lens corrects the parabolic image plane formed by the two auxiliary objectives to a spheric image plane.

In a preferred embodiment of the present invention, the third object is accomplished by adapting a peep preventing means to the door scope. The peep preventing means comprises two polarizers one of which is fixed to the door scope and the other of which is rotatable with respect to the fixed polarizer. By rotating the rotatable polarizer, the transmittivity of the door scope can be reduced to almost zero. Thus, it is possible to prevent persons outside the door from peeping through the door scope.

DESCRIPTION OF THE PREFERRED EMBODIMENTS

Figure 1:
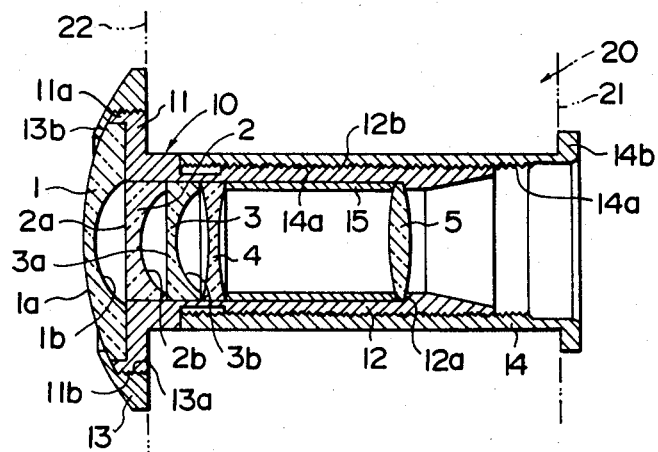
FIG. 1 is a longitudinal sectional view of a door scope in accordance with an embodiment of the present invention.

Referring to FIG. 1 which shows a preferred embodiment of the present invention, the optical system used in the door scope of this invention has a large objective 1 having a convex front face 1a and a concave rear face 1b. The concave rear face 1b has a small area in comparison with the front face and has a small radius of curvature. The optical system further has two auxiliary objectives 2 and 3 provided immediately behind the large objective 1. The auxiliary objectives 2 and 3 are planoconcave lenses or biconcave lenses. In case of employing planoconcave lenses, the concave faces 2b and 3b of the auxiliary lenses 2 and 3 are faced to the rear. In case of employing biconcave lenses, one concave face of each lens is made to have a much smaller radius of curvature than that of the other face and both of the lenses are placed with the faces having the smaller radius of curvature faced to rear. The optical system further has a compensation lens 4. The compensation lens 4 is a biconcave lens and functions to compensate for the distortion of the image plane caused by the three objectives 1, 2 and 3. The image plane formed by the three objectives 1, 2 and 3 is parabolic. The compensation lens 4 corrects the parabolic image plane to a spheric image plane.

Further, the compensation lens 4 is made of a different glass material from that of the objectives 1, 2 and 3 so that the chromatic aberration caused by the three objectives 1, 2 and 3 is corrected. The different glass material of which the compensation lens 4 is made has a different index of refraction from that of the glass of which the objectives 1, 2 and 3 are made. Thus, as is well known in the art, the chromatic aberration is corrected thereby.

Behind the compensation lens 4 is provided an eyepiece 5. The eyepiece 5 is a biconvex lens and is made of the same glass material as that of the objectives 1, 2 and 3.

Figure 3:
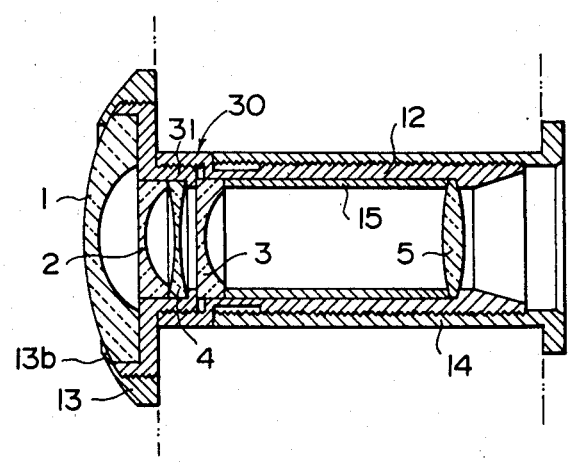
FIG. 3 is a longitudinal sectional view of a door scope in accordance with still another embodiment of the present invention.

Thus, in this embodiment, five lens components consisting of a large objective 1, two auxiliary objectives 2 and 3, a compensation lens 4 and an eyepiece 5 are arranged in this order. The compensation lens 4 may be located between the two auxiliary objectives 2 and 3 as shown in FIG. 3 and described hereinafter.

In the embodiment shown in FIG. 1, the optical system consisting of the five lenses 1 to 5 is supported in a lens barrel 10 which is composed of a front flange 11 having an annular forwardly projected portion 11a carrying on the outer periphery thereof male threads 11b and a rear sleeve 12 having on the inner face thereof an eyepiece stopper step portion 12a and on the outer face thereof male threads 12b. With said male threads 11b of the flange 11 is screw engaged an objective holding cap 13 having female threads 13a on the inner face thereof. Around the sleeve 12 of the lens barrel 10 is screw engaged an outer sleeve 14 having female threads 14a on the inner face thereof. The outer sleeve 14 has at the rear end thereof a flange portion 14b. The flange portion 14b is to be engaged with the inside face 21 of the door 20 to which the door scope is mounted. The ont flange 11 of the lens barrel 10 is to be engaged with the outside face 22 of the door 20. In the rear sleeve 12, an eyepiece holding sleeve 15 is inserted to hold the eyepiece 5 between said eyepiece stopper step portion 12a and itself as shown in FIG. 1. The compensation lens 4 and the two auxiliary lenses 2 and 3 have a diameter equal to the inner diameter of the lens barrel 10 and are inserted in the lens barrel 10 in front of the eyepiece holding sleeve 15. Then, the large objective 1 is put into the space formed in the annular forwardly projected portion 11a of the front flange 11. Thereafter, the objective holding cap 13 is screw engaged with the flange 11 to hold the objective 1 in said space with the holding portion 13b thereof. The holding portion 13b urges the objective 1 rearward when the cap 13 is screwed around the flange 11.

When the door scope is mounted on the door 20, either the outer sleeve 14 or the lens barrel 10 is put into a through-hole of the door 20 up to a position where the flange 14b or 11 thereof abuts the inside face 21 or outside face 22 of the door 20. Then, the other is put into the through-hole and screw engaged with the member first inserted as shown in FIG. 1.

The door scope in accordance with the present invention as described hereinabove referring to FIG. 1 has a very large angle of view. In accordance with the present invention, the angle of view can be made as large as 190°. Further, the door scope of the present invention is free from chromatic aberration since the compensation lens 4 is made of different glass from that of which the objectives 1 to 3 and the eyepiece 5 are made.

Figure 2:
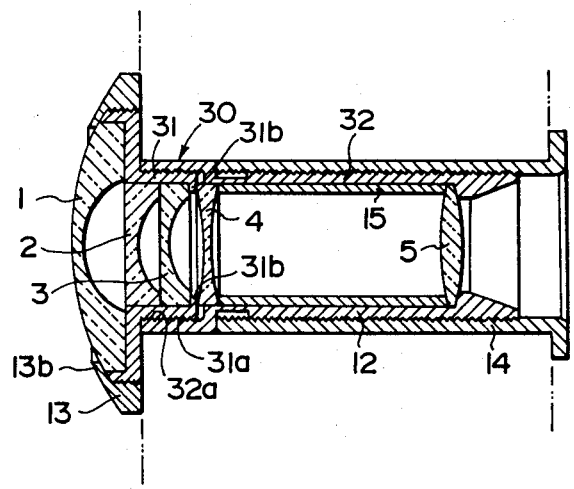
FIG. 2 is a longitudinal sectional view of a door scope in accordance with another embodiment of the present invention.

A second embodiment of the present invention will be described hereinbelow with reference to FIG. 2 in which the elements equivalent to those shown in FIG. 1 are designated with the same reference numerals. In this embodiment, a lens barrel 30 is divided into a front flange portion 31 and a sleeve portion 32. The front flange portion 31 has a flange 11 and a projected portion 11a similar to those shown in FIG. 1. The front flange portion 31 has male threads 31a around the cylindrical body thereof. The sleeve portion 32 has on the front inner face thereof female threads 32a to be screw engaged with the threads 31a. The rear part of the sleeve portion 32 is equivalent to said rear sleeve 12 employed in the first embodiment shown in FIG. 1 and accordingly is designated with the same reference numeral.

The front flange portion 31 has at its rear end an inwardly projected flange 31b on which the rear auxiliary objective 3 abuts from the front. The objectives 1, 2 and 3 are supported between the flange 31b and the holding portion 13b of the objective holding cap 13. When manufacturing the door scope of this embodiment, after the eyepiece 5 is inserted into the rear sleeve 12 the eyepiece holding sleeve 15 is inserted therein to hold the eyepiece 5. Then, the biconcave compensation lens 4 is inserted therein in front of the eyepiece holding sleeve 15. Thereafter, the front flange portion 31 which holds the objectives 1, 2 and 3 is screwed into the front portion of the sleeve portion 32 of the lens barrel 30 up to the position where the rear end flange 31b of the front flange portion 31 abuts on the compensation lens 4. Then, the outer sleeve 14 is screwed on the rear sleeve 12. When mounting the door scope on the door, the outer sleeve 14 is separated from the rear sleeve 12 and these two members are engaged together from opposite sides of the door as described hereinbefore with reference to the first embodiment of the invention.

In the above two embodiments the compensation lens 4 is disposed behind the two auxiliary objectives. However, the compensation lens 4 may be located between the two auxiliary objectives 2 and 3 as shown in FIG. 3. In the embodiment as shown in FIG. 3, the compensation lens 4 and the second auxiliary objective 3 are interchanged in position. The structure and elements are quite the same as those shown in FIG. 2 in all other respects. Therefore, the description of the other elements will be omitted here for simplification.

Figure 4:
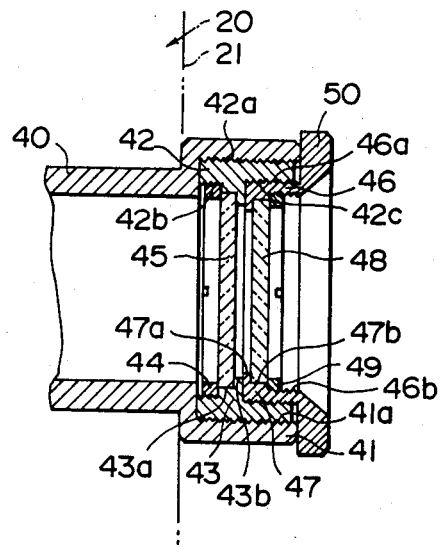
FIG. 4 is a fragmentary longitudinal sectional view of a peep preventing means adapted to the door scope in accordance with still another embodiment of the present invention.

Another preferred embodiment of the present invention in which the door scope is provided with a peep preventing means will hereinbelow as described with reference to FIGS. 4 and 5. Referring to FIG. 4, the rear end of an outer sleeve 40 of the door scope equivalent to said outer sleeve 14 in FIGS. 1 to 3 has a rearwardly extending adapter receiving portion 41 which is cylindrical in shape and has a larger diameter than that of the outer sleeve 40. The adapter receiving portion 41 has on the inner face thereof a female threaded portion 41a. With the female threads 41a is engaged a male threaded portion 42a of a peep preventing device holder 42. The holder 42 is a cylindrical body which has on its outer periphery said male threaded portion 42a and has on its inner periphery a first female threaded portion 42b, a stepped protrusion 43 consisting of a lower part 43a and a higher part 43b, and a second female threaded portion 42c arranged in this order. The first female threaded portion 42b is provided on the front side of the holder 42 to receive a mount ring 44. The lower part 43a of the stepped protrusion 43 receives a first polarizer 45. The first polarizer 45 is fixedly received in the lower part 43a of the stepped protrusion 43 and is pushed against the higher part 43b of the stepped protrusion 43 by the mount ring 44 screwed in the first female threaded portion 42b. The second female threaded portion 42c receives a holder 46 for a second polarizer 48. The holder 46 has on its outer periphery male threaded portion 46a to be screw engaged with said female threaded portion 42c of the peep preventing device holder 42, and has on its inner periphery a stepped protrusion 47 consisting of a higher part 47a and a lower part 47b and a female threaded portion 46b arranged in this order. The lower part 47b of the stepped protrusion 47 receives the second polarizer 48. The second polarizer 48 is pushed against the higher part 47a of the stepped protrusion 47 by a mount ring 49 which is screwed in the female threaded portion 46a. The holder 46 is integrally connected with a manually rotatable flange 50 at its rear end. The rotatable flange 50 is manually rotatable to rotate the holder 46 and the second polarizer 48 with respect to the peep preventing device holder 42 and the first polarizer 45. Consequently, the second polarizer 48 is rotated with respect to the first polarizer 45 to vary the light transmittivity through the two polarizers 45 and 48. By turning the manually rotatable flange 50° by 90°, the transmittivity is changed from maximum to minimum. When the transmittivity is made minimum, it is impossible to see through the door scope. Thus, it is impossible for a person outside the door to peep into the room through the door scope. When the door scope is used by a person inside the door for viewing outside therethrough, the manually rotatable flange 50 is turned to its position of maximum transmittivity.

Figure 5:
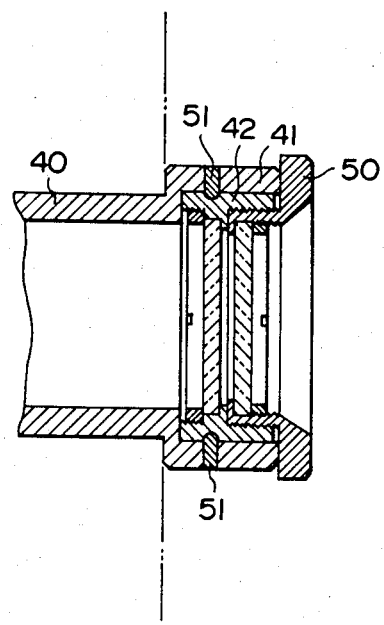
FIG. 5 is a fragmentary longitudinal sectional view of a peep preventing means adapted to the door scope in accordance with a further embodiment of the present invention.

FIG. 5 shows another embodiment of the peep preventing device adapted to the door scope in accordance with the present invention. The embodiment shown in FIG. 5 uses clamp screws 51 to hold the peep preventing device holder 42 in the adapter receiving portion 41 of the outer sleeve 40. As illustrated, the adapter receiving portion 41 does not have a threaded portion on its inner periphery and the holder 42 does not have a threaded portion on its outer periphery. In FIG. 5, the other elements are all equivalent to those shown in FIG. 4.

I claim:

1. A door scope adapted to be mounted in a door for enabling a person inside the door to view outside, said door scope comprising an objective of negative power having a convex front face and a concave rear face, two auxiliary objectives of negative power having concave rear faces located behind said objective, a biconcave compensation lens of negative power located behind said two auxiliary objectives for correcting the curvature of the image plane produced by said objective and said two auxiliary objectives from a parabolic plane to a spheric plane, an eyepiece of positive power located behind said compensation lens, and means for containing said objectives, compensation lens and eyepiece.

2. A door scope as defined in claim 1 wherein said compensation lens is made of a glass material different from that of which said objectives are made.

3. A door scope as defined in claim 1 wherein said auxiliary objectives are planoconcave lenses.

4. A door scope as defined in claim 1 wherein said auxiliary objectives are biconcave lenses which have a front concave face or large radius of curvature and a rear concave face of small radius of curvature.

5. A door scope as in claim 3 where said eyepiece is a biconvex lens.

6. A door scope as in claim 1 where containing means includes a lens barrel having a front flange to be engaged with the outside face of the door and said door scope further includes a sleeve connected to said barrel connected with said lens barrel having a rear flange to be engaged with the inside face of the door.

7. A door scope as in claim 4 where said eyepiece is a biconvex lens.

8. A door scope adapted to be mounted in a door for enabling a person inside the door to view outside, said door scope comprising an objective of negative power having a convex front face and a concave rear face, a first auxiliary objective of negative power having a concave rear face located behind said objective, a biconcave compensation lens of negative power located behind said first auxiliary objective, a second auxiliary objective of negative power having a concave rear face located behind said compensation lens, an eyepiece of positive power located behind said second auxiliary lens, and means for containing said objectives, compensation lens and eyepiece.

9. A door scope as defined in claim 8 wherein said compensation lens is made of a glass material different from that of which said objectives are made.

10. A door scope as defined in claim 8 wherein said auxiliary objectives are planoconcave lenses.

11. A door scope as defined in claim 8 wherein said auxiliary objectives are biconcave lenses which have a front concave face of large radius of curvature and a rear concave face of small radius of curvature.

12. A door scope as in claim 10 where said eyepiece is a biconvex lens.

13. A door scope as in claim 8 where containing means includes a lens barrel having a front flange to be engaged with the outside face of the door and said door scope further includes a sleeve connected to said barrel connected with said lens barrel having a rear flange to be engaged with the inside face of the door.

14. A door scope as in claim 11 where said eyepiece is a biconvex lens.

15. A door scope adapted to be mounted in a door for enabling a person inside the door to view outside, said door scope comprising an objective of negative power having a convex front face and a concave rear face, two auxiliary objectives of negative power having concave rear faces and a biconcave compensation lens of negative power located behind said objective, an eyepiece of positive power located behind said auxiliary objectives and compensation lens, a first polarizer located behind said eyepiece, and a second polarizer located behind said first polarizer, said second polarizer being rotatable about the optical axis of the door scope with respect to said first polarizer.

* * * * *